US006060998A

United States Patent [19]

Miyashita

[11] Patent Number: 6,060,998

[45] Date of Patent: May 9, 2000

[54] RADIO SELECTIVE CALLING RECEIVER HAVING MEANS FOR COUNTING, STORING AND DISPLAYING THE NUMBER OF MESSAGES RECEIVED WITHIN A PREDETERMINED PERIOD OF TIME

[75] Inventor: Yukio Miyashita, Shizuoka, Japan

[73] Assignee: NEC Corporation, Japan

[21] Appl. No.: 08/995,128

[22] Filed: Dec. 19, 1997

[30] Foreign Application Priority Data

Dec. 25, 1996 [JP] Japan .................................... 8-346153

[51] Int. Cl.[7] .................................................... H04M 11/00

[52] U.S. Cl. .................................... 340/825.44; 455/38.1; 455/38.4

[58] Field of Search ............................ 340/825.44, 311.1; 455/38.1, 38.4, 38.5, 405, 407

[56] References Cited

U.S. PATENT DOCUMENTS

| | | | |
|---|---|---|---|
| 4,412,217 | 10/1983 | Willard et al. | 340/825.44 |
| 4,682,148 | 7/1987 | Ichikawa et al. | 340/311.1 |
| 5,173,688 | 12/1992 | DeLuca et al. | 340/825.44 |
| 5,225,826 | 7/1993 | DeLuca et al. | 340/825.44 |
| 5,325,418 | 6/1994 | McGregor et al. | 455/405 |
| 5,398,279 | 3/1995 | Frain | 379/140 |
| 5,461,663 | 10/1995 | Motegi | 379/57 |
| 5,499,020 | 3/1996 | Motohashi et al. | 340/825.44 |
| 5,517,549 | 5/1996 | Lee | 455/407 |
| 5,537,101 | 7/1996 | Nakajima | 340/825.21 |
| 5,682,148 | 10/1997 | Gaskill et al. | 340/825.44 |
| 5,684,861 | 11/1997 | Lewis et al. | 455/405 |
| 5,686,900 | 11/1997 | Ono et al. | 340/825.44 |
| 5,774,061 | 6/1998 | Kudoh | 340/825.44 |
| 5,784,000 | 7/1998 | Sato | 340/825.44 |
| 5,861,818 | 1/1999 | Ohtsuki | 340/825.44 |
| 5,864,616 | 1/1999 | Hartmeier | 379/266 |

FOREIGN PATENT DOCUMENTS

| | | |
|---|---|---|
| 7-79459 | 3/1995 | Japan . |
| 9-266586 | 10/1997 | Japan . |

*Primary Examiner*—William G. Trost
*Assistant Examiner*—Joy Redmon
*Attorney, Agent, or Firm*—Ostrolenk, Faber, Gerb & Soffen, LLP

[57] ABSTRACT

Provided is a radio selective calling receiver that can instantaneously confirm the number of received messages, so that the time required for confirmation can be saved and the calculation of a fee is easy when a frequency-based fee service is utilized. A radio unit receives a radio signal that includes an identification signal and an information signal; a controller compares the identification signal with its own identification signal to confirm that the radio signal is for the controller, and extracts the information signal from the radio signal to specify the time at which the radio signal was received; an LCD is used to display information including the information signal or the time using a plurality of display forms; and a storage means counts a number of the radio signals received and stores the count number. The count number of radio signals received is displayed in a specific count display area of the LCD.

8 Claims, 5 Drawing Sheets

RADIO SELECTIVE CALLING RECEIVER HAVING MEANS FOR COUNTING, STORING AND DISPLAYING THE NUMBER OF MESSAGES RECEIVED WITHIN A PREDETERMINED PERIOD OF TIME

BACKGROUND OF THE INVENTION

1. Field of the Invention

The present invention relates to a radio selective calling receiver that is able to store messages or information such as receiving time of messages and the number of receipt of the messages.

2. Description of the Prior Art

Conventionally, a radio selective calling receiver (generally called a pocket bell or a pager, and hereinafter referred to, as needed, simply as a receiver) has a function for internally storing the contents (dates, messages, etc.) of data that were received in the past.

Furthermore, according to one function when the storage capacity determined for a receiver is sufficient, data that were received in the past can be stored, so that a user of the receiver is able to confirm the contents of the data. According to another function, if a new message is received when the storage area is filled to capacity, the message that is the oldest is deleted and the newer message is stored.

According to a technique disclosed in Japanese Unexamined Patent Publication No. Hei 7-79459, number of unconfirmed messages are counted and is compared with a predetermined value. When the number is greater than the predetermined value, a notification is transmitted to the user of a receiver to confirm such unconfirmed messages.

Since the above described conventional selective calling receiver does not manage the number of received calls for each day and each month, a date for each message received in the past must be confirmed when the number of calls for each month, each week or each day are confirmed, and a great amount of time is wasted.

Recently, a frequency-based fee service, according to which fees vary depending on the number of calls received, has come to be employed. If a new message is received when the storage area is filled to capacity, however, an old message is deleted and the new message is stored, so that it is difficult for the owner of the receiver to calculate the fee.

SUMMARY OF THE INVENTION

To resolve such shortcomings, it is one object of the present invention to provide a radio selective calling receiver that can instantaneously confirm the number of received messages, so that the time required for confirmation is saved and the calculation of a fee is easy when a frequency-based fee service is utilized.

To achieve the above object, according to a first aspect of the present invention, a radio selective calling receiver comprises:

radio communication means for receiving a radio signal consisting of an identification signal and an information signal;

control means for comparing the identification signal with an identification signal for the radio selective calling receiver to confirm that the radio signal is for the radio selective calling receiver, and for extracting the information signal from the radio signal to specify the time at which the radio signal was received;

display means for displaying information including the information signal or the time having a plurality of display forms; and storage means for counting a number of radio signals that are received, and for storing the count number, wherein the display means has a count display area for displaying the count number that is stored.

According to a second aspect of the present invention, in the radio selective calling receiver, the storage means has a plurality of storage areas in each of which the count number of radio signals received obtained for each period of time is stored, and the display means displays one or more of the radio signals that are stored in the storage areas.

According to a third aspect of the present invention, in the radio selective calling receiver, the periods of time that differ in the plurality of storage areas are one or more selected time cycles representing a year, a month, a week, a day or an hour, and the storage means has a plurality of sequential storage areas for the one or more time cycles.

According to a fourth aspect of the present invention, the radio selective calling receiver further comprises selection means for selecting a display form to be displayed on the display means, and for selecting, for each of the time cycles, one or more storage areas, from among the plurality of sequential storage areas, and for displaying the count number of the radio signals received and stored in the selected storage areas.

According to the present invention, the radio communication means receives a radio signal that includes an identification signal and an information signal; the control means compares the identification signal with its own identification signal to confirm that the radio signal is for the control means, and extracts the information signal from the radio signal to specify the time at which the radio signal was received; the display means displays information including the information signal or the time having a plurality of display forms; and the storage means counts the number of radio signals received and stores the count number. The number of radio signals received is displayed in a specific count display area of the display means.

The storage means has a plurality of storage areas in each of which a number of a radio signals received for each time cycle is stored, and the display means can display one or more radio signals received and stored in the storage areas.

The time cycles that differ for each of the storage areas are one or more time cycles selected from among every year, every month, every week, every day or every hour, and the storage means has a plurality of sequential storage areas for storing one or more time cycles.

The selection means selects a display form to be displayed on the display means, and also selects, from among the sequential storage areas, one or more storage areas and displays the count number of the radio signals received that is stored therein.

That is, according to the present invention, the number of radio signals received that contain messages can be stored, for example, for each month and each day, and the user of the radio selective calling receiver can immediately confirm from the display on the display means the count number stored for the signals received each month and each day.

DETAILED DESCRIPTION OF THE PREFERRED EMBODIMENT

The present invention will now be described by reference to accompanying drawings.

Figure 1:
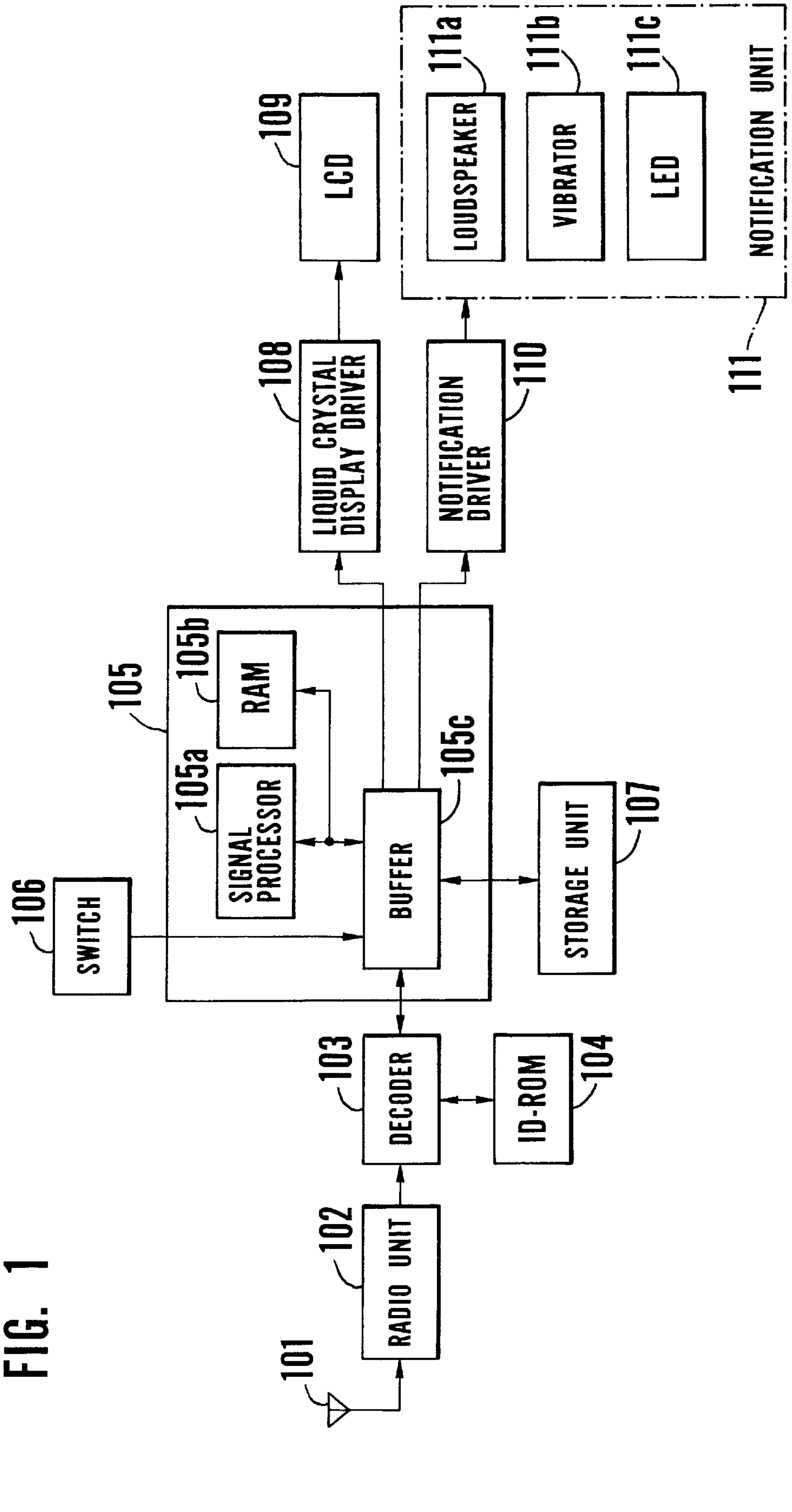
FIG. 1 is a block diagram illustrating the arrangement of a radio selective calling receiver according to one embodiment of the present invention.

FIG. 1 is a block diagram illustrating the arrangement of a radio selective calling receiver according to one embodiment of the present invention. In FIG. 1 is shown the arrangement of a pager (radio selective calling receiver) that displays, on a display device, the number of signals received after they are received.

In FIG. 1, a radio selective calling signal, from a base section (not shown) of a paging system to which the pager belongs, is received by an antenna 101. A radio unit 102 demodulates the radio selective calling signal received by the antenna 101, and shapes the waveform of the radio signal and converts it into a digital signal.

A decoder 103 decodes the digital signal output by the radio unit 102, compares the digital signal with its own selective call signal, which is written on an ID (Identification symbol)-ROM (Read Only Memory) 104, and outputs a message signal.

A controller 105 stores the message signal in a storage unit 107. Although the controller 105 has a timer circuit for counting a current year, month, day and time, no diagram and no detailed explanation for the timer circuit will be given.

The controller 105 comprises: a signal processor 105*a,* for changing the number of received message signals received in accordance with a program stored in the storage unit 107, or for externally outputting a command signal; a RAM 105*b,* in which are temporarily stored a temporary state, such as the time and a released condition, or a calculation signal obtained by the signal processor 105*a;* and a buffer 105*c,* for connecting the IC to an external device. In the customized arrangement, an 8-bit microcomputer is employed for the signal processor 105*a*.

The storage unit 107, which is constituted by a RAM (Random Access Memory) or an EEPROM (Electrically Erasable Programmable ROM), is used to store received messages and the number of messages that are received.

Figure 2:
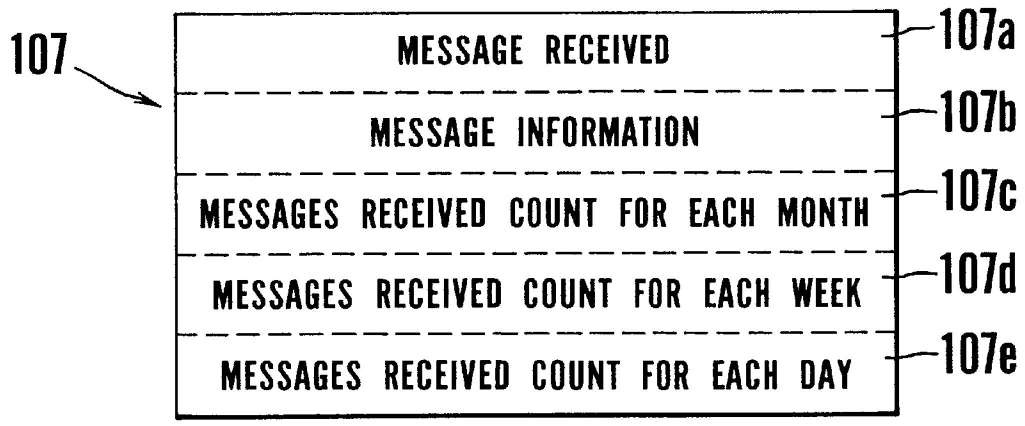
FIG. 2 is a schematic diagram illustrating a memory map for a storage unit of the radio selective calling receiver in FIG. 1.

FIG. 2 is a schematic diagram illustrating a memory map in the storage unit 107. As is shown in FIG. 2, several storage areas are provided for the storage unit 107. In this embodiment, messages that are received are sequentially stored in a storage area 107*a.* Message management numbers corresponding to the messages that are received and reception date information, or information concerning whether it has been confirmed that a specific message was read, is stored in a storage area 107*b*. The total number of calls received each month is stored in a storage area 107*c,* the total number of calls received each week is stored in a storage area 107*d,* and the total number of calls received each day is stored in a storage area 107*e.*

A switch 106 is connected to the controller 105. The user of the pager manipulates the switch 106 to change the display or the notification form, or to establish a limit for call reception or to release the limit. While the switch 106 is constituted by an array composed of a plurality of depression button switches, no detailed diagram of the array is given.

A liquid crystal driver 108 drives an LCD (Liquid Crystal Display) 109 on which a received message and the number of calls received is displayed.

A notification device 110 drives a notification unit 111 that performs a notification process when a message is received.

The notification unit 111 includes a loudspeaker 111*a* through which is released an audible acoustic signal, a vibrator 111*b* that actuates a vibrator motor, and an LED (Light Emitting Diode) 111*c* that outputs a light emission signal to notify a user that a message has been received.

Processing by the controller 105 will now be described. When a message signal from the decoder 103 is transmitted to the signal processor 105*a* through the buffer 105*c,* the message signal is transferred from the buffer 105*c* and stored in the storage unit 107, and a count number of calls received which is stored in the storage unit 107 is read to the buffer 105*c.* This count number is incremented by one, and the new count number is again stored in the storage unit 107. The count number is also stored in the RAM 105*b.* When the signal processor 105*a* receives the message signal, it also outputs a notification instruction to the notification driver 110 through the buffer 105*c.* In accordance with an instruction stored in the RAM 105*b,* either the loudspeaker 111*a,* the vibrator 111*b* or the LED 111*c* is selected as the notification means.

The signal processor 105*a* measures the time that has elapsed since it output the notification instruction, and when a predetermined period of time has elapsed, or when a halt instruction has been received from the switch 106, an operation halt command is output to the notification driver 110 to halt the operation. The signal processor 105*a* again reads the count number that was previously stored in the RAM 105*b,* and permits the liquid crystal driver 108 to display the count on the LCD (Liquid Crystal Device) 109.

Figure 3:
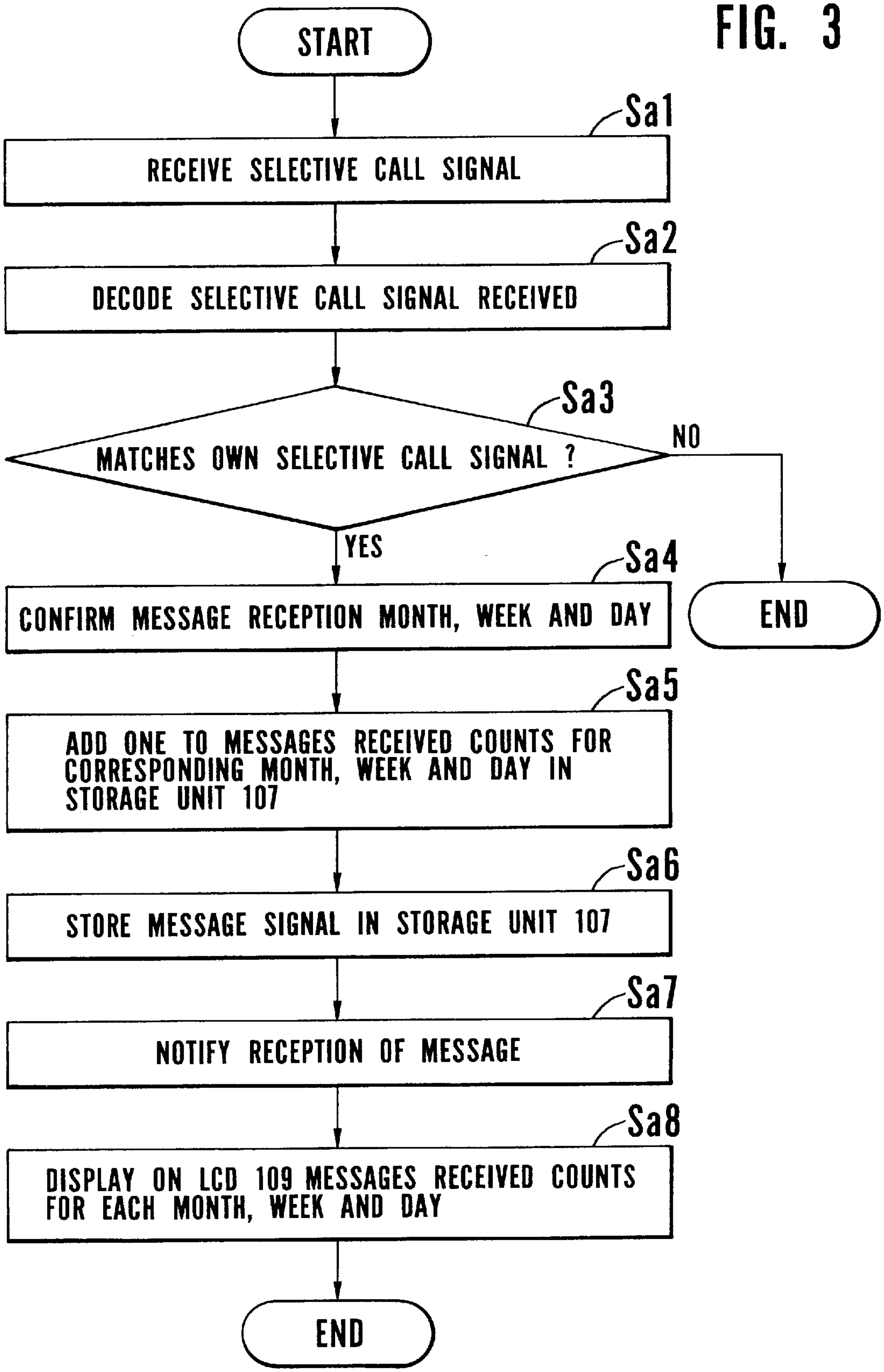
FIG. 3 is a flowchart showing message reception processing.

FIG. 3 is a flowchart showing the message reception processing performed by the arrangement shown in FIG. 1. First, a selective call signal is received by the radio unit 102 via the antenna 101 (step Sa1).

The decoder 103 decodes the selective call signal that has been received (step Sa2), and determines whether the selective call signal matches its own selective call signal that is written in the ID-ROM 104 (step Sa3).

When the received selective call signal does not match the selective call signal of the decoder 103, the controller 105 neither transmits an acknowledgement nor updates the number of received calls. Processing is thereafter terminated.

When the two selective call signals match, the controller 105 confirms the month, week and day that the selective call signal was received (step Sa4), and for the corresponding month, week and day, the calls received counts stored in the storage unit 107 are all incremented by one (step Sa5).

Furthermore, the controller 105 stores a message signal in the storage unit 107 following the selective call signal (step Sa6), and the notification unit 111 issues notification of the reception of a message (step Sa7).

When the notification of reception process at step Sa7 is halted, the controller 105 count number stored in the storage unit 107, and permits the liquid crystal display driver 108 to display on the LCD 109 the count value for each month, week and day (step Sa8).

Next, an explanation will be given for the processing performed by the controller 105 when the user of the pager manipulates the switch 106 to display the number of calls received.

Figure 4:
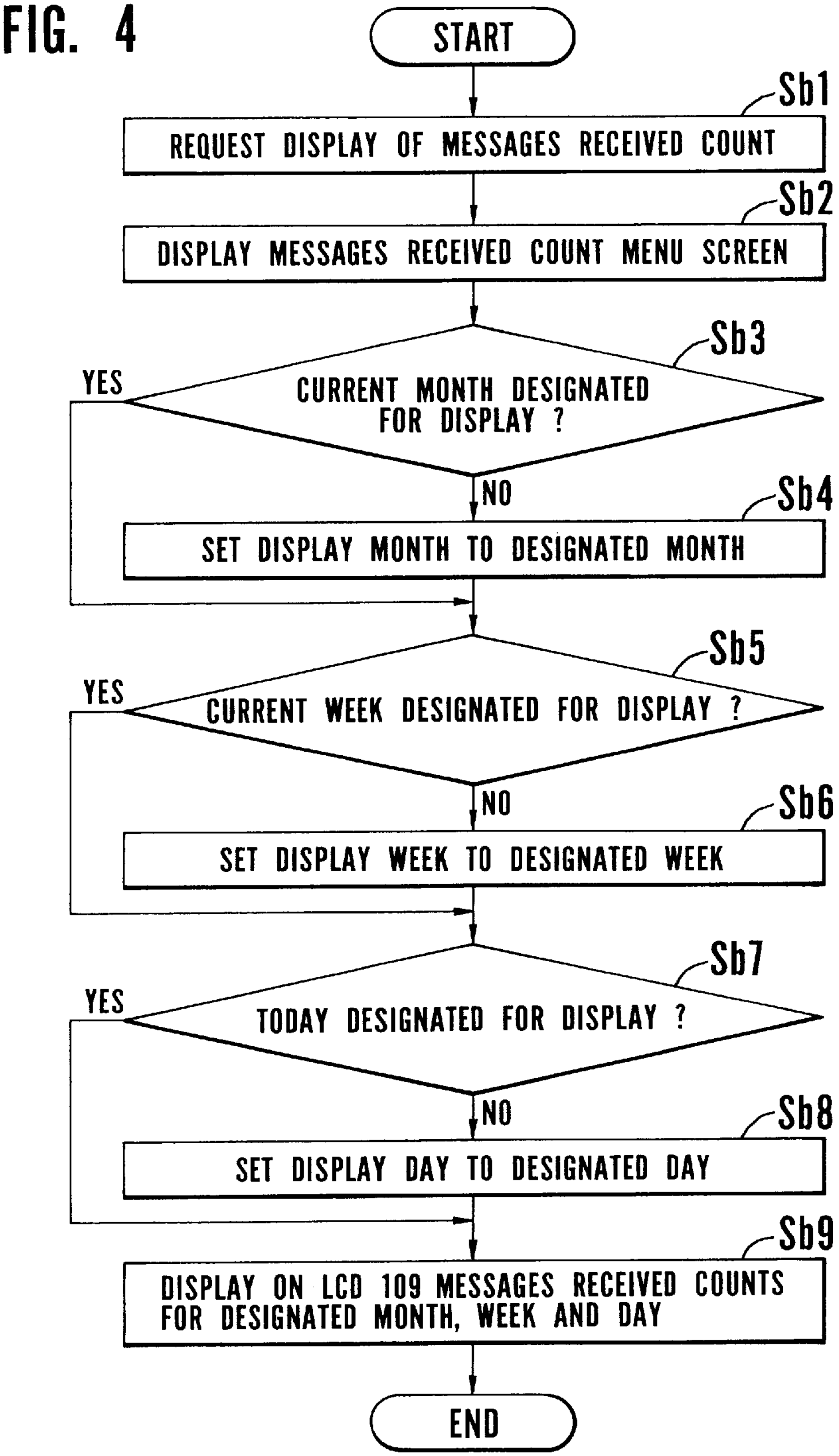
FIG. 4 is a flowchart showing a process for displaying the number of received radio signals.

FIG. 4 is a flowchart showing a process in this embodiment for displaying the number of calls received.

In FIG. 4, the user manipulates the switch 106 to request the display of the count number on the LCD 109 (step Sb1). The controller 105 then permits the liquid crystal display driver 108 to display a menu screen (not shown) on the LCD 109 for the selection of a time cycle for a count number that is to be displayed (step Sb2), and waits until the user manipulates the switch 106.

Figure 5A:
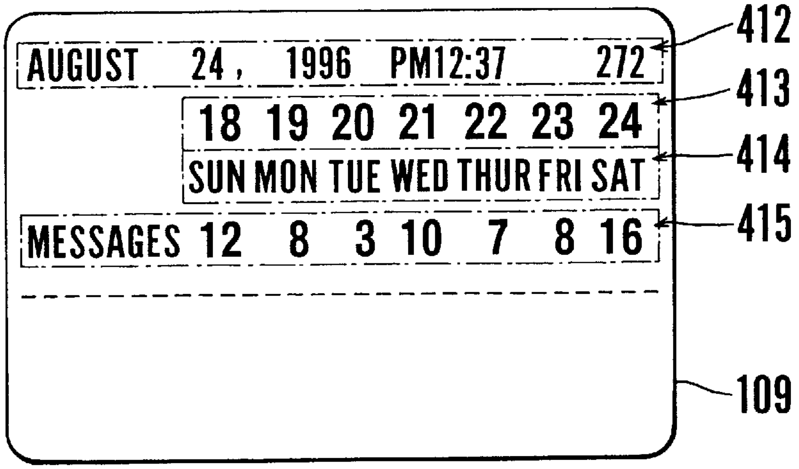
FIGS. 5A, 5B and 5C are diagrams of different LCD displays on which are shown the number of received calls.
Figure 5B:
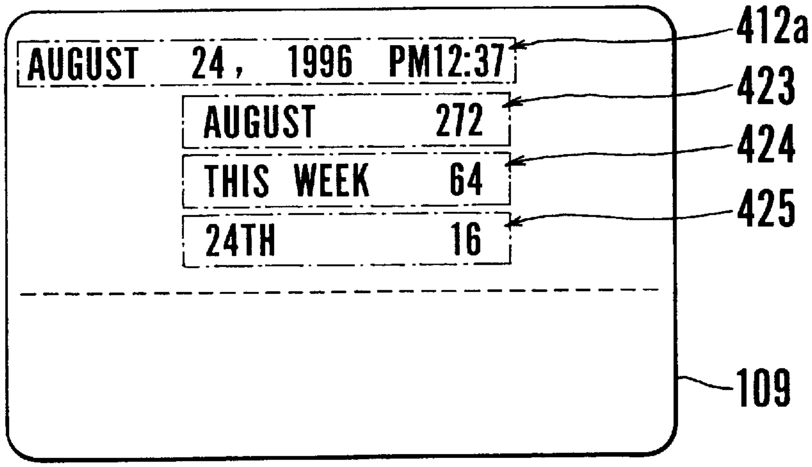
Figure 5C:
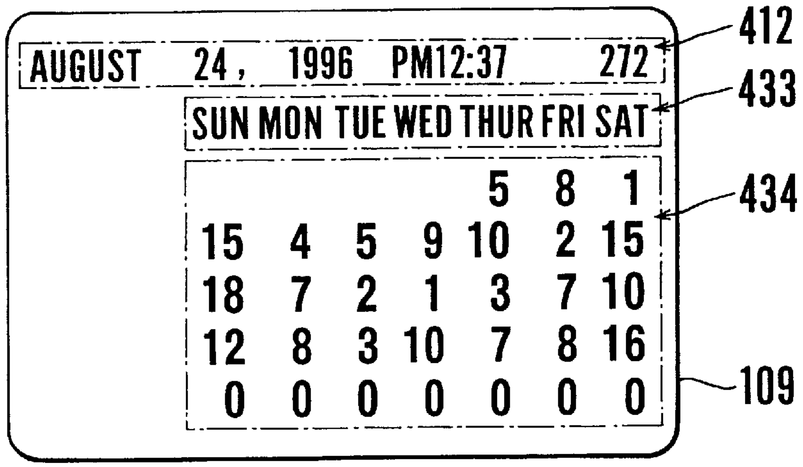

FIGS. 5A to 5C are diagrams of displays on the LCD 109 showing the number of calls. In FIG. 5A, one week (from Sunday to Saturday in the diagram) is defined as a time cycle.

In FIG. 5A, a date (year, month and day), time and the number of received calls are displayed in a display area 412; the days of the month are displayed in a display area 413; the days of a week corresponding to the days of the month in the display area 413 are displayed in a display area 414; and the number of calls received on the days of the month in the display area 413 and the days of a week in the display area 414 are displayed in a display area 415.

In FIG. 5B is shown a case where only the count number of the calls received are displayed. In FIG. 5B, a date (year, month and day) and time are displayed in a display area 412*a*; the total number of calls received during the current month (August in FIG. 5B) is displayed in a display area 423; the total number of calls received this week is displayed in a display area 424; and the number of calls received on the current date (the 24th, in FIG. 5B) is displayed in a display area 425.

In FIG. 5C, the numbers of calls received are displayed with one month (August in FIG. 5C) being defined as a time cycle. In FIG. 5C, the days of a week are displayed in a display area 433, and the number of calls received each day is displayed at a position in a display area 434 that corresponds to a specific day.

A user manipulates the switch 106 when the menu screen is displayed on the LCD 109 and selects one of the screens shown in FIGS. 5A to 5C for display on the LCD 109.

In response to the manipulation of the switch 106, the controller 105 determines whether or not the requested display month is the current month (step Sb3). When a month other than the current month is requested, the month to be displayed is set to the month that is instructed (step Sb4).

Then, the controller 105 determines whether or not the requested display week is the current week (step Sb5). If the week that is requested is not the current week, the week to be displayed is set to the week that is instructed (step Sb6).

Following this, the controller 105 determines whether or not the requested display day is the current day (step Sb7). If the day that is requested is not the current day, the day to be displayed is set to the day that is instructed (step Sb8).

Finally, the controller 105 reads from the storage unit 107 the number of the calls received for the month, the week and the day that are set (if they are not set, the current month, week and day), and displays the count number on the LCD 109.

As is described in the embodiment, regardless of the size of the memory capacity of the storage area 107*a* of the storage unit 107, the count number for each month, which is stored in the storage area 107*a* of the storage unit 107, the count number for each week, which is stored in the storage area 107*d,* and the count number for each day, which is stored in the storage area 107*e,* are added together each time a message is received.

Therefore, even when the number of messages stored in the storage area 107*a* exceeds the memory capacity, and when the storing of a new message is halted or an old message is deleted, the number of received messages is incremented each time a message is received, and management of the messages received count is easy.

The arrangements for the storage unit and for the notification unit explained in the above embodiment are merely examples, and the present invention is not limited to these arrangements. An LCD is only an example display device, and display formats other than those shown for the LCD in the embodiment may be employed.

In the above embodiment, a plurality of storage areas are provided for the storage unit, but separate storage unit may be provided for different kinds of information, such as messages received and the number of messages received.

As is described above, according to the present invention, the radio communication means receives a radio signal that includes an identification signal and an information signal; the control means compares the identification signal with its own identification signal to confirm that the radio signal is for the control means, and extracts the information signal from the radio signal to specify the time at which the radio signal was received; the display means displays information including the information signal or the time having a plurality of display forms; and the storage means counts the radio signals received and stores the count. The number of radio signals received is displayed in a specific count display area of the display means.

The storage means has a plurality of storage areas in each of which a count number of radio signal received for each time cycle is stored, and the display means can display one or more count number stored in the storage areas.

The time cycles that differ for each of the storage areas are one or more time cycles selected from among every year, every month, every week, every day or every hour, and the storage means has a plurality of sequential storage areas for storing one or more time cycles.

The selection means selects a display form to be displayed on the display means, and also selects, from among the sequential storage areas, one or more storage areas and displays the count number that are stored therein.

That is, according to the present invention, for each month and for each day, for example, the number of radio signals received that carry messages can be stored, and the user of the radio selective calling receiver can immediately confirm the counts of the signals received each month and each day from the display on the display means. As a result, a savings can be realized in the time required for confirmation processing, and a radio selective calling receiver can be provided that facilitates the calculation of fees when a frequency-based fee service is utilized.

What is claimed is:

1. A radio selective calling receiver comprising:

radio communication means for receiving a radio signal consisting of an identification signal and an information signal;

control means for:

comparing said identification signal with an identification signal for said radio selective calling receiver to determine that said radio signal is for said radio selective calling receiver;

extracting said information signal from said determined radio signal;

confirming each of a plurality of time periods in which said determined radio signal was received; and incrementing each of a plurality of counts corresponding to a respective quantity of determined radio signals for each of said plurality of time periods;

display means for displaying information including at least one of said information signal and at least one of said plurality of counts, said at least one of said plurality of counts being displayed in one of a plurality of display forms; and storage means for storing said plurality of counts.

2. A radio selective calling receiver according to claim 1, wherein said storage means has a plurality of storage areas corresponding to each of said plurality of time periods.

3. A radio selective calling receiver according to claim 2, wherein each of said time periods corresponds to one of a plurality of time cycles for a year, a month, a week, a day and an hour, said plurality of storage areas being sequentially arranged for each of said plurality of time cycles.

4. A radio selective calling receiver according to claim 3, further comprising selection means for selecting one of said display forms to be displayed on said display means, and for selecting, for each of said time cycles, one or more storage areas, from among said plurality of sequentially arranged storage areas, said display means displaying said count stored in said selected storage area.

5. A radio selective calling receiver comprising:

a radio unit, said radio unit receiving a radio signal consisting of an identification signal and an information signal;

a decoder comparing said identification signal with an identification symbol for said radio selective calling receiver to determine whether said radio signal is for said radio selective calling receiver, said decoder extracting said information signal if said radio signal is for said selective calling receiver;

a controller, said controller confirming each of a plurality of time periods in which a radio signal determined to be for said radio selective calling receiver was received, said controller incrementing each of a plurality of counts corresponding to a respective quantity of said determined radio signals for each of said plurality of time periods;

a display, said display displaying information including at least one of said information signal and at least one of said plurality of counts, said at least one of said plurality of counts being displayed in one of a plurality of display forms; and a storage unit, said storage unit storing said plurality of counts.

6. A radio selective calling receiver according to claim 5, wherein said storage unit has a plurality of storage areas corresponding to each of said plurality of time periods.

7. A radio selective calling receiver according to claim 6, wherein each of said time periods corresponds to one of a plurality of time cycles for a year, a month, a week, a day and an hour, said plurality of storage areas being sequentially arranged for each of said plurality of time cycles.

8. A radio selective calling receiver according to claim 7, further comprising a switch, said switch selecting one of said display forms to be displayed on said display, and selecting, for each of said time cycles, one or more storage areas, from among said plurality of sequentially arranged storage areas, said display displaying said count stored in said selected storage area.

* * * * *